(12) United States Patent
Murai

(10) Patent No.: US 8,350,410 B2
(45) Date of Patent: Jan. 8, 2013

(54) UNINTERRUPTIBLE POWER SUPPLY

(75) Inventor: Yasumasa Murai, Tokyo (JP)

(73) Assignee: Fuji Electric Co., Ltd (JP)

( * ) Notice: Subject to any disclaimer, the term of this patent is extended or adjusted under 35 U.S.C. 154(b) by 165 days.

(21) Appl. No.: 12/612,929

(22) Filed: Nov. 5, 2009

(65) Prior Publication Data

US 2010/0110731 A1    May 6, 2010

(30) Foreign Application Priority Data

Nov. 6, 2008   (JP) .................................. 2008-285339

(51) Int. Cl.
*H02J 9/00*    (2006.01)
*G05B 13/02*    (2006.01)

(52) U.S. Cl. ........................................... 307/64; 700/34
(58) Field of Classification Search .................... 307/64; 700/33, 34
See application file for complete search history.

(56) References Cited

U.S. PATENT DOCUMENTS

| | | | | |
|---|---|---|---|---|
| 5,943,246 | A * | 8/1999 | Porter ........................... | 700/293 |
| 7,948,118 | B2 * | 5/2011 | Chambon ....................... | 307/66 |

FOREIGN PATENT DOCUMENTS

| | | |
|---|---|---|
| JP | 11-252826 | 9/1999 |
| JP | 2002-218673 A | 8/2002 |
| JP | 2003-061262 A | 2/2003 |
| JP | 2007-014141 A | 1/2007 |
| TW | 2004-15843 | 2/1992 |
| TW | 2006-09717 | 9/1993 |
| TW | 2007-21636 | 11/1994 |
| TW | 2008-41555 | 4/1996 |

* cited by examiner

*Primary Examiner* — Michael Rutland Wallis

(57) ABSTRACT

An uninterruptible power supply is able to switch an operation mode between an on-line operation method and an off-line operation method for a wider range of commercial power supplies. An uninterruptible power supply 1 includes; a rectifier 11 for converting AC power supplied from a commercial power source 2 into DC power; a storage battery 12 for storing the DC power converted; an inverter 13 for converting the DC power into AC power; a selecting means (14 to 18) for selecting one of an off-line operation mode and an on-line operation mode according to a detection result of detecting a condition of the AC power supplied from the power source 2; in the off-line operation mode, AC power supplied from the power source 2 is supplied to a load device 3 under normal operating condition, and when any failure happens in relation to the AC power supplied from the power source 2, the uninterruptible power supply supplies a power output generated by the inverter 13 to the load device 3; in the on-line operation method, a power output from the inverter 13 is supplied to the load device 3 all the time including a period of normal operating condition; and a setup means (19) for variably setting criterion values, with which the selecting means (14 to 18) selects an operation mode depending on the condition of the AC power supplied from the power source 2.

7 Claims, 3 Drawing Sheets

UNINTERRUPTIBLE POWER SUPPLY

CROSS REFERENCE TO RELATED APPLICATIONS

The present application claims priority from Japanese Patent Application No. 2008-285339 filed on Nov. 6, 2008, the contents of which are incorporated herein by reference.

TECHNICAL FIELD

The present invention relates to an uninterruptible power supply.

RELATED ART

Uninterruptible power supplies (abbreviation: UPS) are widely used as backup power supplies for the purpose of ensuring electric power even in case of a failure of commercial power supply. An uninterruptible power supply of AC power has a circuit configuration in which generally AC power from a commercial power source is converted into DC power by a rectifier, and the DC power is then stored in a storage battery, and converted into AC power by an inverter.

Uninterruptible power supply operation methods include an off-line operation method and an on-line operation method. In the off-line operation method; electric power supplied from a commercial power source is supplied to a load device, as it is, under normal operating condition; and when any failure such as a power failure happens in relation to the electric power supplied from the commercial power source, an uninterruptible power supply supplies AC power generated by an inverter thereof to the load device. On the other hand, in the on-line operation method; AC power generated by an inverter in an uninterruptible power supply is always supplied to the load device.

In the off-line operation method, it is not necessary for the inverter to supply electric power under normal operating condition. Therefore, the off-line operation method has an advantage of less power consumption. However, when the quality of commercial power supply is poor, switching to/from the commercial power supply from/to the inverter output is carried out so frequently that a storage battery of the uninterruptible power supply deteriorates soon. Meanwhile, the on-line operation method has an advantage that electric power is always supplied from the inverter, and therefore electric power having stable quality can be supplied to the load device regardless of quality of the commercial power supply. However, on the other hand, power loss necessarily occurs through conversion between AC power and DC power, and therefore power consumption becomes greater in the on-line operation method. Furthermore, a cooling fan needs to be always in operation, and it generates noises.

As a publicly known technology, Patent Document 1 discloses switching between the off-line operation method and the off-line operation method automatically according to fluctuation condition of the commercial power supply. Namely, in an uninterruptible power supply disclosed in Patent Document 1; if it is judged that errors on voltage, frequency, phase, and waveform of the commercial power supply occur frequently, or a depth of discharge of the storage battery is insufficient; switching is carried out automatically from the off-line operation method to the on-line operation method. Contrarily, if it is judged that such errors of the commercial power supply do not occur frequently, or the depth of discharge of the storage battery is sufficient; switching is carried out automatically from the on-line operation method to the off-line operation method.

In the technology described in Patent Document 1, the operation mode is switched, depending on whether the numbers of errors that happen in the commercial power supply during a predetermined monitoring time period are greater or smaller than the corresponding criterion numbers predetermined. If the monitored numbers are greater than the criterion numbers (high frequency in error happenings), the operation mode is switched to the on-line operation method. If they are smaller than the criterion numbers (low frequency in error happenings), the operation mode is switched to the off-line operation method. However, in the technology described in Patent Document 1, the uninterruptible power supply judges whether the commercial power supply is erroneous or not, regardless of requirements on power supply stability that the load device needs. Therefore, even when the load device is able to accept the commercial power supply having fairly less-stable quality, the off-line operation method cannot be chosen if once the uninterruptible power supply judges that the commercial power is erroneous.

Patent Document 1: JP H11-252826A

SUMMARY

It is an object of the present invention for solving the problem described above to provide an uninterruptible power supply in which it is possible to switch an operation mode between the on-line operation method and the off-line operation method for a wider range of commercial power supplies.

According to the present invention, it is provided an uninterruptible power supply including: a rectifier for converting AC power supplied from a power source into DC power; a storage battery for storing the DC power converted; an inverter for converting the DC power into AC power; a selecting means for selecting one of an off-line operation mode and an on-line operation mode according to a detection result of a condition of the AC power supplied from the power source; in the off-line operation method, AC power supplied from the power source is supplied to a load device under normal operating condition, and when any failure happens in relation to the AC power supplied from the power source, the uninterruptible power supply supplies a power output generated by the inverter to the load device; in the on-line operation method, a power output from the inverter is supplied to the load device all the time including a period of normal operating condition; and a setup means for variably setting criterion values, with which the selecting means selects an operation mode depending on the condition of the AC power supplied from the power source.

With respect to each of the voltage and the frequency of the AC power supplied from the power source, preferably, the setup means should set up one of multiple criterion values. With respect to each of the voltage and the frequency of the AC power supplied from the power source, criterion values may be specified as the multiple values. Preferably, the selecting means should select the off-line operation method as an operation mode when both the values of the voltage and the frequency in relation to the AC power supplied from the power source are within their corresponding criterion value ranges set by the setup means.

The uninterruptible power supply may further include a switching setup circuit for setting up operation of the selecting means by using switches; and the switching setup circuit may specify the criterion values as the setup means, and the switching setup circuit may also specify fixedly one of the off-line operation method and the on-line operation method as an operation mode of the selecting means. In this case, the specified criterion values may become effective when the operation mode of the selecting means is fixedly set with none of the off-line operation method and the on-line operation method.

When the switching setup circuit does not specify any fixed operation mode, the selecting means may accept a command for fixedly setting one of the off-line operation mode and the on-line operation mode by an external communication.

According to the present invention; the criterion values, for selecting an operation mode depending on the condition of the AC power supplied from the power source, can be set variably. In this way, in a case where the load device can accept a power source that is relatively unstable, modifying the criterion values makes it possible to select the off-line operation mode as well. Therefore, it becomes possible to switch an operation mode between the on-line operation method and the off-line operation method for a wider range of commercial power supplies.

BRIEF DESCRIPTION OF THE DRAWINGS

Specific embodiments of the present invention will now be described, by way of example only, with reference to the accompanying drawings in which.

DESCRIPTION OF EXEMPLARY EMBODIMENTS

[Configuration]

Figure 1:
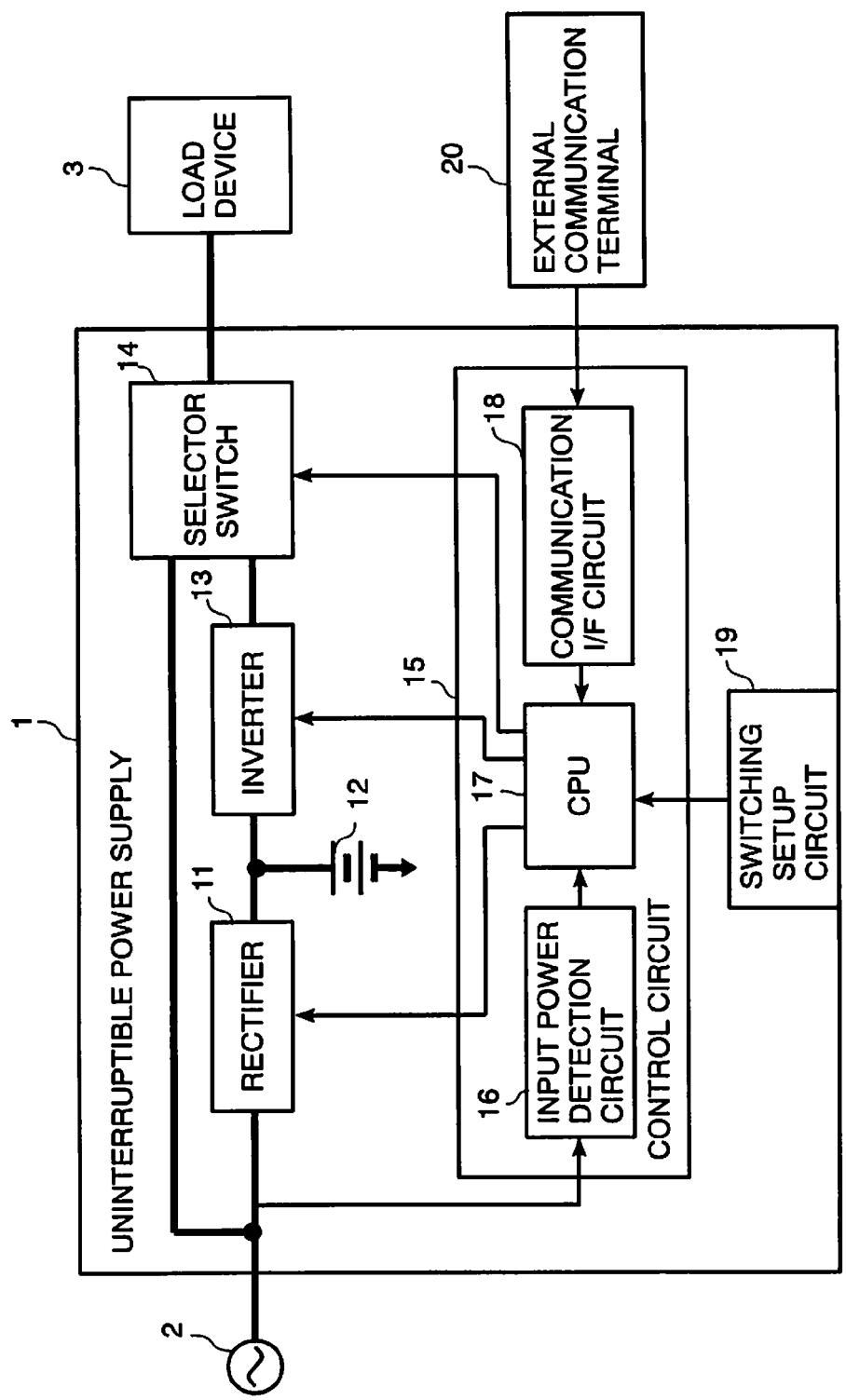
FIG. 1 is a block diagram showing an uninterruptible power supply according to an embodiment of the present invention.

FIG. 1 is a block diagram showing an uninterruptible power supply according to an embodiment of the present invention. An uninterruptible power supply 1, to which a commercial power source 2 as a power source is connected, supplies electric power to a load device 3 without power interruption.

The uninterruptible power supply 1 includes; a rectifier 11 for converting AC power supplied from the commercial power source 2 into DC power; a storage battery 12 for storing the DC power converted; and an inverter 13 for converting the DC power into AC power. Furthermore, the uninterruptible power supply 1 detects a condition of the AC power supplied from the commercial power source 2; and then enables two operation modes, one mode at a time, according to a result of the detection. Namely, the uninterruptible power supply 1 includes a selector switch 14 and a control circuit 15 as selection means for selecting either an off-line operation method or an on-line operation method according to the result of the detection described above; wherein in the off-line operation method, AC power supplied from the commercial power source 2 is supplied to the load device 3 under normal operating condition; and when any failure happens in relation to the AC power supplied from the commercial power source 2, the uninterruptible power supply supplies a power output generated by the inverter 13 to the load device 3; and meanwhile, in the on-line operation method; a power output from the inverter 13 is supplied to the load device 3 all the time including a period of normal operating condition. The uninterruptible power supply 1 further includes a switching setup circuit 19 as a setup means for variably setting criterion values, with which the selector switch 14 and the control circuit 15 select an operation mode depending on the condition of the AC power from the commercial power source 2. The control circuit 15 includes; an input power detection circuit 16 for detecting the condition of the AC power supplied from the commercial power source 2; a central processing unit (CPU) 17 for controlling the rectifier 11, the inverter 13, and the selector switch 14 while selecting an operation mode; and a communication interface circuit 18.

[Operation]

The rectifier 11 converts the AC power, supplied from the commercial power source 2, into DC power, and stores the DC power into the storage battery 12, and also supplies the DC power to the inverter 13. The inverter 13 converts the DC power from either the rectifier 11 or the storage battery 12 into AC power. The selector switch 14 selects either the AC power from the commercial power source 2 or that from the inverter 13, according to a command from the control circuit 15, and outputs the selected AC power to the load device 3.

The input power detection circuit 16 of the control circuit 15 detects the condition of the AC power supplied from the commercial power source 2. The central processing unit 17 of the control circuit 15 selects an operation mode, and then sets up operations of the rectifier 11, the inverter 13, and the selector switch 14; according to a detection result of the input power detection circuit 16, a setup of the switching setup circuit 19, and a setup from an external communication terminal 20 via the communication interface circuit 18.

If the control circuit 15 selects the off-line operation method as an operation mode, the central processing unit 17 sets up the selector switch 14 so as to supply the electric power from the commercial power source 2, as it is, to the load device 3. When any failure such as a power failure happens in the off-line operation mode with respect to the electric power supplied from the commercial power source 2, the selector switch 14 is switched to select the route of the inverter 13 so that the inverter 13 converts the DC power stored in the storage battery 12 into AC power, which is supplied to the load device 3 via the selector switch 14.

If the control circuit 15 selects the on-line operation method as an operation mode, the central processing unit 17 sets up the selector switch 14 so as to supply the output from the inverter 13 to the load device 3. When the commercial power source 2 normally supplies electric power in the on-line operation mode, the rectifier 11 converts the supplied electric power into DC power, which is stored in the storage battery 12 and also supplied to the inverter 13. When any failure such as a power failure happens in the on-line operation mode with respect to the electric power supplied from the commercial power source 2, the DC power from the rectifier 11 is interrupted, and then the inverter 13 converts the DC power stored in the storage battery 12 into AC power, which is then output.

The switching setup circuit 19 sets up operation of selecting an operation mode of the control circuit 15, by using switches; wherein the switching setup circuit 19 includes a group of switches that are manually set. The switching setup circuit 19 specifies criterion values with which the control circuit 15 selects an operation mode, and meanwhile the switching setup circuit 19 can also specify fixedly either the off-line operation method or the on-line operation method as an operation mode to be selected by the control circuit 15. The criterion values specified by the switching setup circuit 19 become effective when the operation mode to be selected by the control circuit 15 is fixedly set with none of the off-line operation method and the on-line operation method. In the following explanation, operation modes fixedly specified with the off-line operation method and the on-line operation method are called 'Fixed off-line mode' and 'Fixed on-line mode', respectively; and another operation mode which is not fixedly set with either of the off-line operation method and the on-line operation method is called 'Bi-mode-switchable mode'.

For the switching setup circuit 19; with respect to each of the voltage and the frequency of the AC power supplied from the commercial power source 2, one of multiple criterion values can be specified as each criterion value to be used for the bi-mode-switchable mode. For example; it is assumed that one of selectable voltage ranges including ±5%, ±10%, and ±15% of the rated voltage can be specified as a voltage criterion value, and meanwhile, one of selectable frequency ranges including ±5%, ±3%, and ±1% of the rated frequency can be specified as a frequency criterion value. Also, it is assumed that those criterion values with respect to the voltage and the frequency can be combined arbitrarily. Namely, when 3 selectable voltage ranges and 3 selectable frequency ranges are combined, 9 value combinations can be obtained as a result. These settings of criterion values are effective only in the bi-mode-switchable mode, and become meaningless in any other mode.

In the present embodiment; if the switching setup circuit 19 does not specify any fixed operation mode, the control circuit 15 becomes ready to accept a command for fixedly setting either the off-line operation mode or the on-line operation mode by an external communication. In other words; when the switching setup circuit 19 specifies the bi-mode-switchable mode, the control circuit 15 can select either the off-line operation mode or the on-line operation mode to fixedly set the operation mode according to a setting by the external communication terminal 20 via the communication interface circuit 18. If once either the off-line operation mode or the on-line operation mode is fixed according to the setting through communication, it is impossible to automatically select one of the two operation modes until the communication is interrupted.

[Operation Mode Selection]

Figure 2:
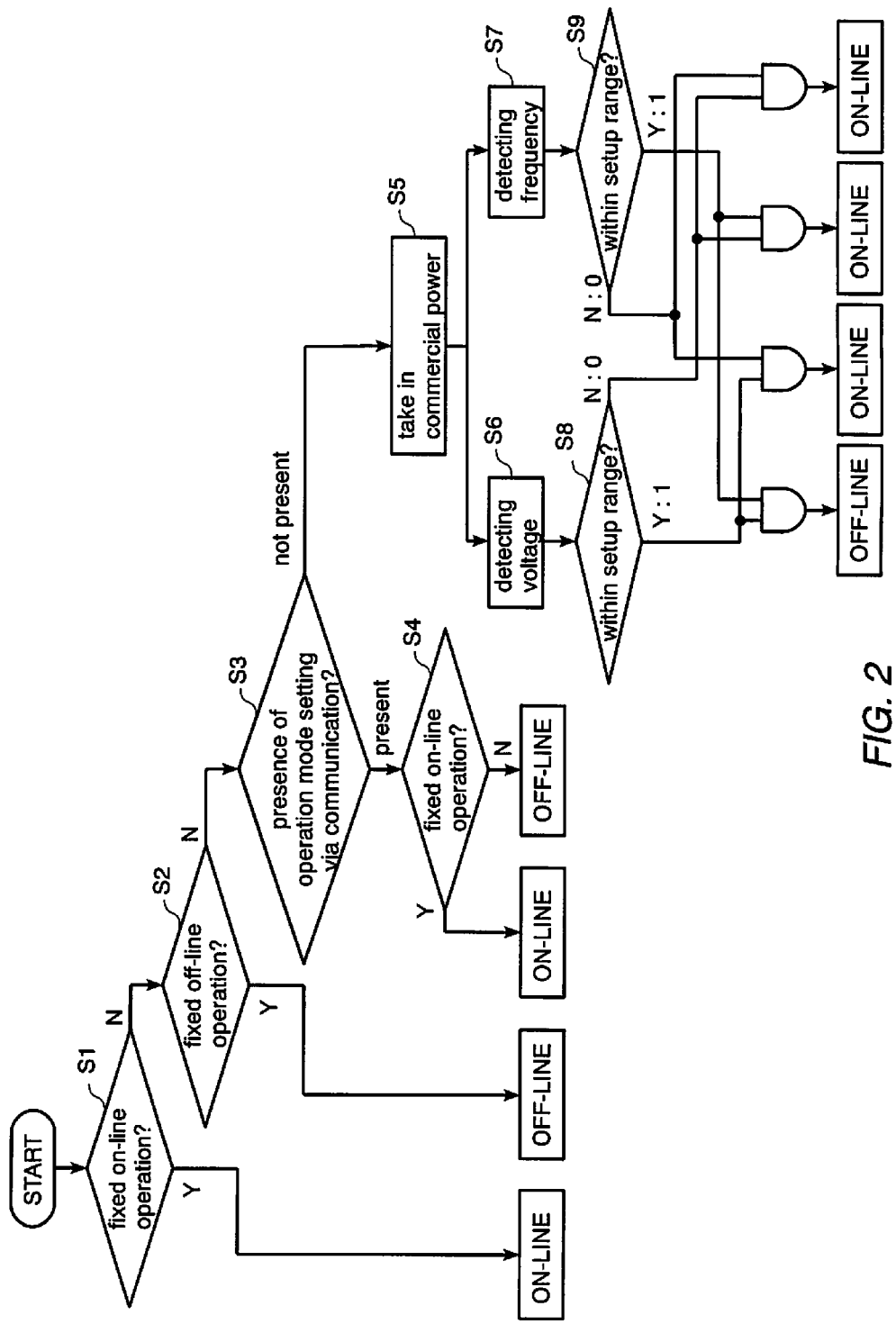
FIG. 2 is a flowchart of operation mode selection by a central processing unit of the uninterruptible power supply shown in FIG. 1.

FIG. 2 is a flowchart of operation mode selection by the central processing unit 17.

If the switching setup circuit 19 specifies an operation mode with the fixed on-line operation method (Step S1; Yes), the central processing unit 17 fixedly sets up the on-line operation method for the uninterruptible power supply 1. On the other hand, if the switching setup circuit 19 specifies an operation mode with the fixed off-line operation method (Step S1; No & Step S2: Yes), the central processing unit 17 fixedly sets up the off-line operation method for the uninterruptible power supply 1.

Under a condition where the switching setup circuit 19 specifies the bi-mode-switchable mode (Both steps S1 & S2: No); if an operation mode setting is given from the external communication terminal 20 via the communication interface circuit 18 (Step S3: Presence) and the setting is the fixed on-line operation method (Step S4: Yes), the on-line operation method is set for the uninterruptible power supply 1. Meanwhile, if the branch at Step S4 is No, the off-line operation method is set for the uninterruptible power supply 1.

Under a condition where the switching setup circuit 19 specifies the bi-mode-switchable mode, and no operation mode setting is given from the external communication terminal 20 (Both steps S1 & S2: No, and Step S3: No presence), the central processing unit 17 sets up a mode, in which either the off-line operation method or the on-line operation method is automatically selected, as an operation mode for the uninterruptible power supply 1. In this mode, detection results of the input power detection circuit 16 are taken in (Step S5) to detect the voltage and the frequency of the AC power supplied from the commercial power source 2 (Steps S6 & S7). Then, it is judged whether or not each detected value is within its corresponding setup range of the voltage and the frequency specified by the switching setup circuit 19 (Steps S8 & S9). If both the values of the voltage and the frequency are within their corresponding setup ranges (Both steps S8 & S9: Yes), the off-line operation method is selected as an operation mode for the uninterruptible power supply 1. If at least one of the values of the voltage and the frequency exceeds its corresponding setup range (At least one of Steps S8 & S9: No), the central processing unit 17 selects the on-line operation method as an operation mode for the uninterruptible power supply 1.

For the uninterruptible power supply 1 described above, 3 voltage setup ranges and 3 frequency setup ranges are individually prepared as criterion values for determining an error of the commercial power source 2; and if at least one of the detected values of the commercial power source 2 exceeds its corresponding setup range, the on-line operation method is selected. Meanwhile, if both the detected values of the commercial power source 2 are within their corresponding setup ranges, the off-line operation method is selected. Even in a case where the technology described in Patent Document 1 judges that the voltage of the commercial power source 2 is erroneous, the uninterruptible power supply 1 described above can still operate with the off-line operation method through changing the setup of the criterion value to be set with a setup range. Furthermore, the technology described in Patent Document 1 assumes a case in which the commercial power source is generally stable and sometimes erroneous, but it does not assume a case in which the commercial power source is always erroneous. On the other hand, the uninterruptible power supply 1 described above can variably set the criterion values for judging an error. Moreover, since combinations of a plurality of criterion values are used for judging an error, implementation of switching operation between the on-line operation method and the off-line operation method is possible for wider range of commercial power supply.

Figure 3:
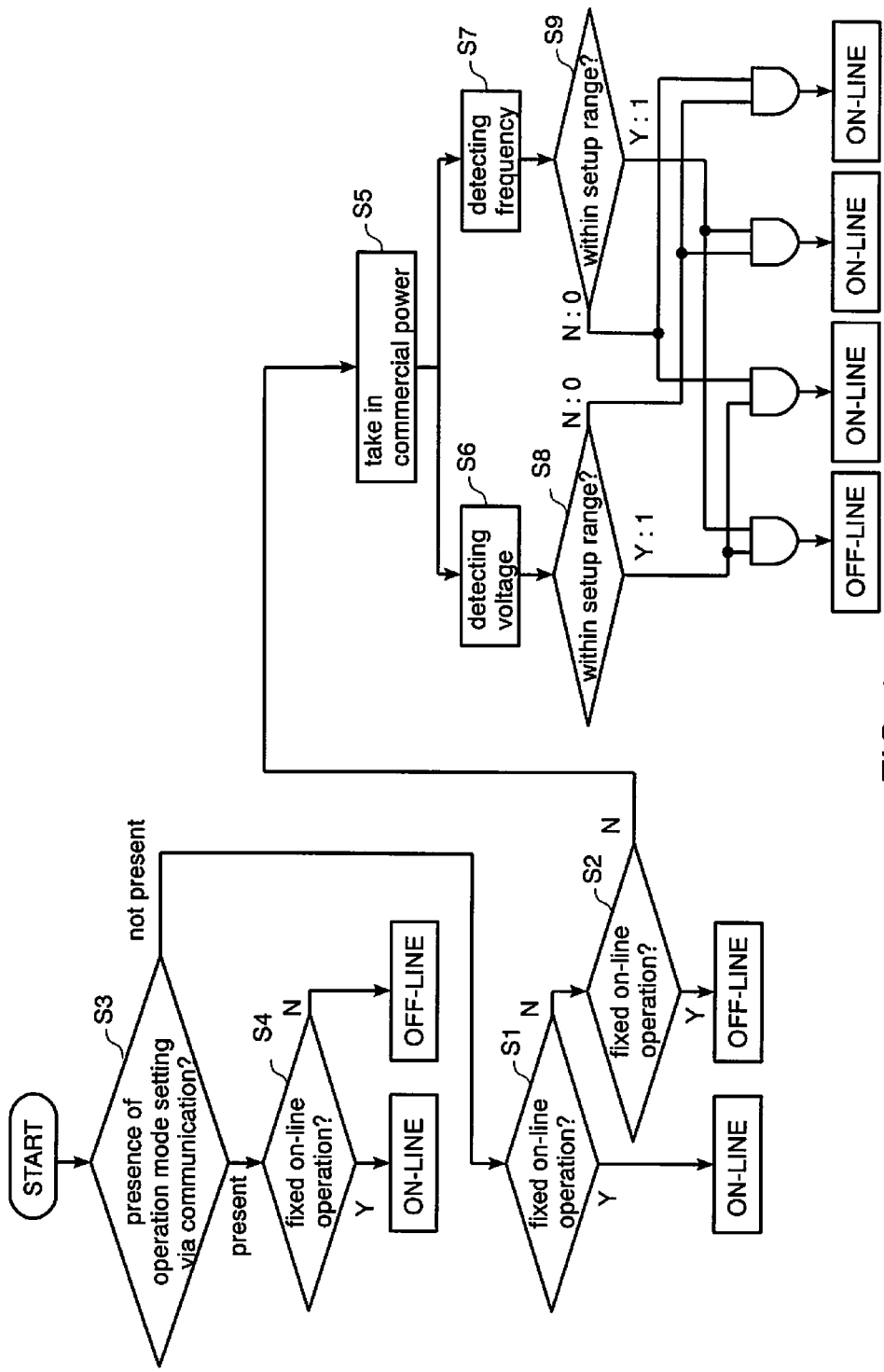
FIG. 3 is a modification of the flowchart shown in FIG. 2.

FIG. 3 is a modification of the flowchart shown in FIG. 2. In the explanation described above, an operation mode can be fixedly set through communication from the external communication terminal 20 only when the bi-mode-switchable mode is specified by the switching setup circuit 19. However, it is possible to prioritize the setting through communication. Namely, as shown in the flowchart of FIG. 3, Steps S3 in the flowchart of FIG. 2 can also be carried out prior to Steps S1 & S2.

The embodiment according to the present invention is explained above, and various variations and modifications may be made without changing the concept of the present invention. For example, in the explanation above, the bi-mode-switchable mode is defined as a condition where the switching setup circuit 19 specifies neither the fixed off-line mode nor the fixed on-line mode. However, the switching setup circuit 19 may have a switch for selecting the bi-mode-switchable mode. In this case, a configuration can be so made as to turn off a switch for fixedly setting an operation mode when the bi-mode-switchable mode is selected by the switch described above. Moreover, there is another possible configuration in which only either of the fixed off-line mode and the fixed on-line mode can be set when the bi-mode-switchable mode is not specified; and still another configuration in which a step of setting any such fixed modes is skipped.

As criterion values for selecting an operation mode, voltage values and frequency values of 2 ranges and 4 ranges or more may be set. Furthermore, criterion values may be set with respect not only to the voltage and the frequency but also to the phase, the waveform, the peak voltage, and the like. It is also possible to select an operation mode according to criterion values of the voltage only, or the frequency only. Moreover, it is still possible that; among the multiple kinds of parameters, such as the voltage, the frequency, and the like; only some kinds of parameters have criterion values of multiple ranges while each of other kinds of parameters has a criterion value of a single range only.

What is claimed is:

1. An uninterruptible power supply comprising:
   a rectifier for converting AC power supplied from a power source into DC power;
   a storage battery for storing the DC power converted;
   an inverter for converting the DC power into AC power;
   a selecting means for selecting one of an off-line operation mode and an on-line operation mode according to a detection result of detecting a condition of the AC power supplied from the power source; in the off-line operation method, AC power supplied from the power source is supplied to a load device under normal operating condition, and when any failure happens in relation to the AC power supplied from the power source, the uninterruptible power supply supplies a power output generated by the inverter to the load device; in the on-line operation method, a power output from the inverter is supplied to the load device all the time including a period of normal operating condition; and
   a setup means for variably setting criterion values, with which the selecting means selects an operation mode depending on the condition of the AC power supplied from the power source wherein, the uninterruptible power supply further includes a switching setup circuit for setting up operation of the selecting means by using switches; and the switching setup circuit specifies the criterion values as the setup means, and the switching setup circuit can also specify fixedly one of the off-line operation method and the on-line operation method as an operation mode of the selecting means.

2. The uninterruptible power supply according to claim 1; wherein, with respect to each of the voltage and the frequency of the AC power supplied from the power source, the setup means sets up one of multiple criterion values.

3. The uninterruptible power supply according to claim 2; wherein, with respect to each of the voltage and the frequency of the AC power supplied from the power source, criterion values are specified as the multiple values.

4. The uninterruptible power supply according to claim 1; wherein, the selecting means selects the off-line operation method as an operation mode when both the values of the voltage and the frequency in relation to the AC power supplied from the power source are within their corresponding criterion value ranges set by the setup means.

5. The uninterruptible power supply according to claim 1; wherein the specified criterion values become effective when the operation mode of the selecting means is fixedly set with none of the off-line operation method and the on-line operation method.

6. The uninterruptible power supply according to claim 1; wherein, even if the switching setup circuit does not specify any fixed operation mode, the selecting means accepts a command for fixedly setting one of the off-line operation mode and the on-line operation mode by an external communication.

7. The uninterruptible power supply according to claim 5, wherein, even if the switching setup circuit does not specify any fixed operation mode, the selecting means accepts a command for fixedly setting one of the off-line operation mode and the on-line operation mode by an external communication.

* * * * *